United States Patent
Ishikawa

[19]

[11] Patent Number: 5,825,116
[45] Date of Patent: Oct. 20, 1998

[54] AC GENERATOR FOR VEHICLE HAVING COMBINED STRUCTURE OF FIELD COIL AND PERMANENT MAGNET

[75] Inventor: Hiroaki Ishikawa, Nagoya, Japan

[73] Assignee: Denso Corporation, Kariya, Japan

[21] Appl. No.: 740,667

[22] Filed: Oct. 31, 1996

[30] Foreign Application Priority Data

Nov. 2, 1995 [JP] Japan .................................. 7-286057

[51] Int. Cl.⁶ .................................................. H02K 1/122
[52] U.S. Cl. ........................... 310/263; 310/181; 310/156
[58] Field of Search ..................................... 310/181, 263

[56] References Cited

U.S. PATENT DOCUMENTS

| | | | |
|---|---|---|---|
| 4,654,551 | 3/1987 | Farr | 310/112 |
| 5,132,581 | 7/1992 | Kusase | 310/263 |
| 5,237,232 | 8/1993 | Kitamura | 310/263 |
| 5,306,977 | 4/1994 | Hayashi | 310/263 |
| 5,536,987 | 7/1996 | Hayashi et al. | 310/263 |

FOREIGN PATENT DOCUMENTS

| | | | |
|---|---|---|---|
| 2582164 | 11/1986 | France | 310/263 |
| 4-255451 | 9/1992 | Japan | 310/263 |

*Primary Examiner*—Steven L. Stephan
*Assistant Examiner*—Karl I. Eizo Tamai
*Attorney, Agent, or Firm*—Cushman Darby & Cushman IP Group of Pillsbury Madison & Sutro LLP

[57] ABSTRACT

An AC generator has a rotor with permanent magnets disposed between claw poles. The rotor has Lundell-type pole cores having a boss portion where a field coil is wound and claw poles. The permanent magnets are sintered ferrite magnets and disposed between opposite side surfaces of the adjacent claw poles and magnetized to have the same magnetic pole as the claw pole adjacent thereto. A ratio between the cross-sectional area per pole of the magnetic path of the boss portion and peripheral surface area of the claw poles facing the teeth of the stator core is designed to be between 70% to 120%.

7 Claims, 4 Drawing Sheets

AC GENERATOR FOR VEHICLE HAVING COMBINED STRUCTURE OF FIELD COIL AND PERMANENT MAGNET

BACKGROUND OF THE INVENTION

1. Field of the Invention

The present invention relates to an AC generator for a vehicle which is driven by an engine and supplies an AC power.

2. Description of the Related Art

A conventional AC generator for a vehicle has a magnetic-field-rotor with a so called Lundell-type pole core and a field coil. A part of magnetic flux generated in the pole cores leaks through the adjacent claw poles. Therefore, an amount of the magnetic flux passing through the magnetic path of the rotor is usually larger than an amount of the magnetic flux passing through the peripheral surface of the claw poles. In general, the ratio between the cross-sectional area of the magnetic path of the winding portion of the claw poles and the area of the peripheral surface of the claw poles is approximately 140% because the cross-sectional area of the magnetic path is designed to be proportional to the amount of the magnetic flux in view of reducing the rotor weight and increasing the output power per weight thereof.

In order to increase the output power, permanent magnets are disposed between the adjacent claw poles thereby reducing leakage of the magnetic flux. However, if the magnetic flux of the permanent magnet is added to the stator, an excessive voltage may be generated even when the field coil is not energized.

In order to solve such a problem, an optimum ratio between the area of the claw poles where the permanent magnet is in contact with and the base cross-sectional area of each of the claw poles has been proposed in JPA 4-255451.

However, if such a ratio between the cross-sectional-area of the winding portion and the peripheral-surface-area of the claw poles is applied to the rotor having the permanent magnet between the claw poles, the cross-sectional area of the magnetic path is not properly formed because the magnetic flux of the permanent magnet is not taken into account. Therefore, the weight of the rotor is not reduced and the power per rotor-weight does not become maximum.

On the other hand, even if the rotor has the permanent magnet between the claw poles, the cross-sectional area of the magnetic path only includes the portion of the claw poles in contact with the permanent magnet and the base portion of claw poles and the weight of the claw poles is smaller than that of the stator. Therefore, the rotor weight can not be reduced sufficiently.

SUMMARY OF THE INVENTION

The present invention has been made in view of the above circumstances, and an object of the present invention is to provide an economical AC generator for a vehicle which has a rotor with a permanent magnet between the claw poles, generates an increased power per weight of the rotor with less amount of material.

According to one aspect of the invention, a cross-sectional area of magnetic path of the pole core per each pole is between 70% and 120% of peripheral surface area of each of said claw poles facing said teeth. Therefore, the magnetic-flux-density of each magnetic path becomes even. According to a test, when the ratio of the above areas exceeds 120%, power increase of the rotor per weight drops steeply. On the other hand, when it decreases less than 70%, the excessive generator voltage with the non-excited field increases steeply. Therefore, the effective magnetic flux is kept at the same level as the conventional generator and the rotor weight is reduced, or the rotor weight is kept at the same level as the conventional generator and the effective magnetic flux is increased, resulting in increase of the power per weight.

According to another aspect of the present invention, sintered ferrite magnets which are widely available are used.

According to another aspect of the present invention, a centrifugal-force-resistive generator is provided by using molded ferrite magnet because of the low specific gravity thereof. The molded ferrite magnet forms a circular member having a plurality of magnetized poles and is disposed between the claw poles. Therefore, it is assembled with ease.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
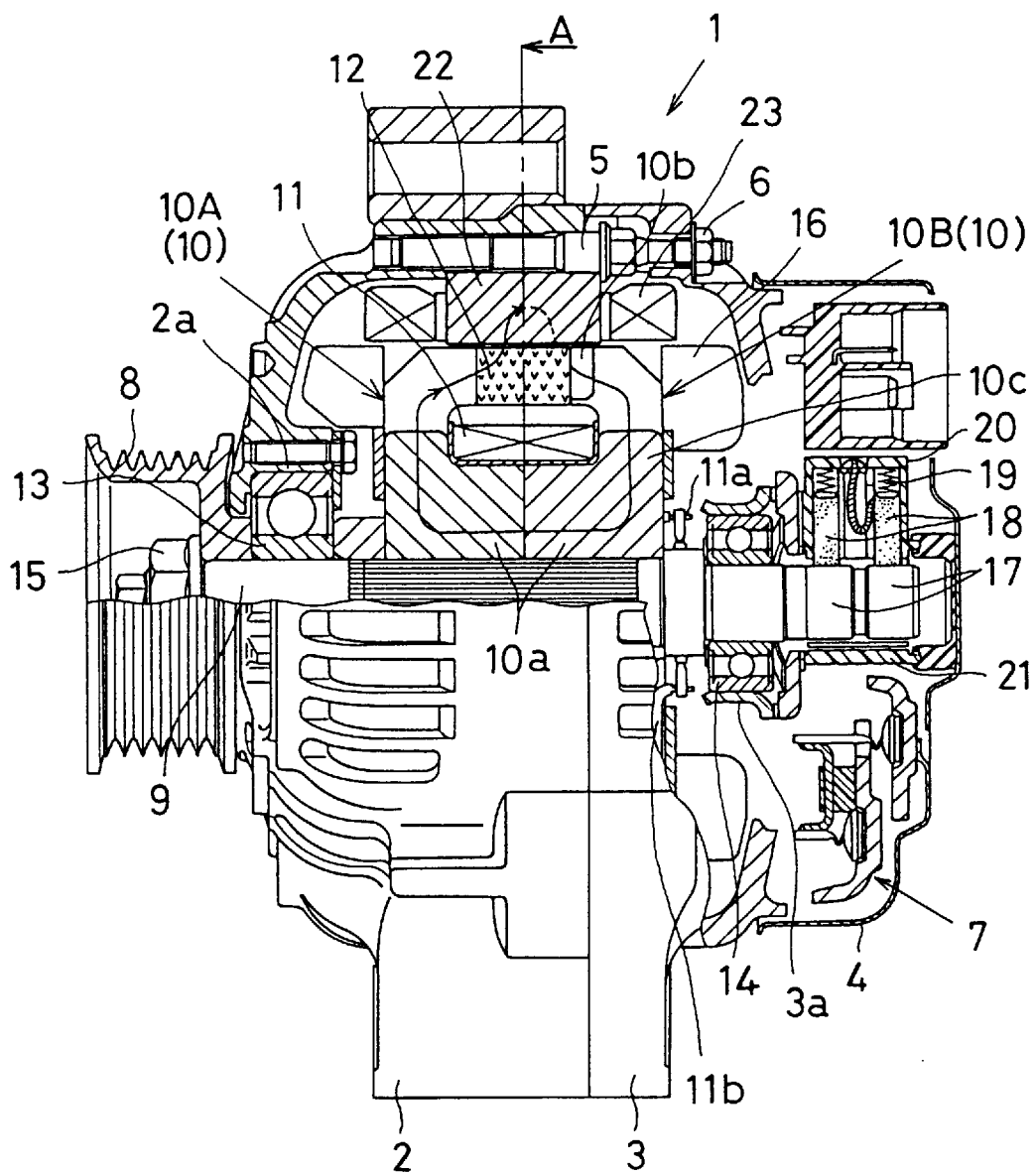
FIG. 1 is a cross-sectional view illustrating an AC generator for a vehicle.

An AC generator for a vehicle according to the present invention is described next.

The AC generator 1 for a vehicle according to an embodiment of the present invention is composed of a front frame 2, rear frame 3, an end cover 4, a rotor and stator.

The front frame 2 and the rear frame 3 are made of aluminum die-cast and meet together at the outer open ends. They are fixed by a plurality of stad bolts 5 and nuts 6.

The end cover 4 is fixed to the rear frame 3 and covers a brush unit fixed to a portion outside the rear frame 3, a voltage regulator (not shown) and a rectifier unit 7.

The rotor is composed of a shaft 9 to which engine rotation is transmitted through a pulley 8, a pair of Lundell-type pole cores 10 press-fitted to the shaft 9, a field coil 11 wound in the pole cores 10 and a plurality of permanent magnets 12 installed into the cores 10.

The shaft 9 is rotatably supported through bearings 13 and 14 by respective boss portions 2a and 3a of the front frame 2 and the rear frame 3. The pulley 8 is fitted to an end of the shaft outside the front frame 2 and fastened by a lock nut 15.

Figure 6:
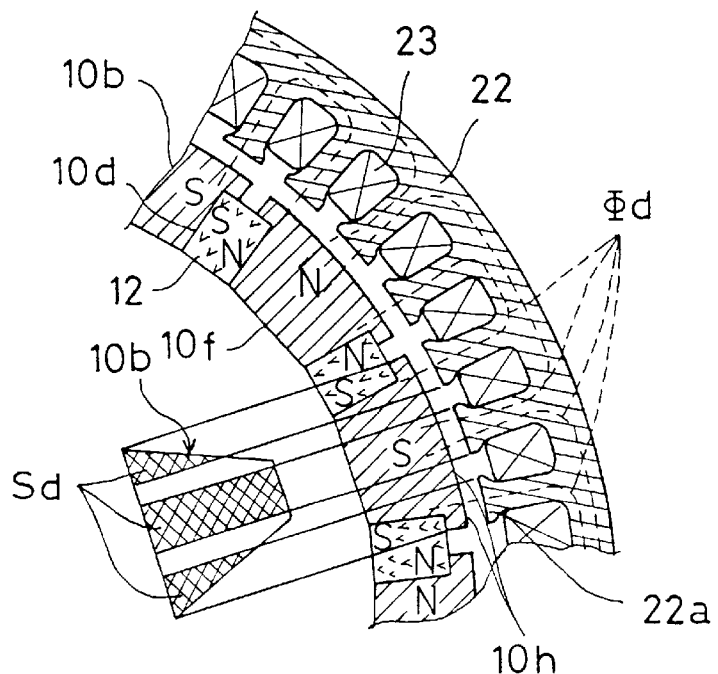
FIG. 6 is a schematic view showing a relationship between a claw pole and teeth of the stator core.

A pair of the pole cores 10 has a cylindrical boss portion 10a, a plurality of claw poles 10b and disk portions 10c connecting the boss portions 10a and each of the claw poles 10b. Cylindrical boss portion 10a extends radially between, i.e., is bounded radially by, field coil 11 and shaft 9. The pole cores 10 are press-fitted to the shaft 9 from opposite sides in the axial direction so that each claw pole of one of the pole cores extends between two claw poles of the other pole core over the field coil. Each of the claw poles has trapezoidal peripheral surface tapering toward the edge as shown in FIG. 6. Two cooling fans 16 are fixed by welding or the like to the opposite axial ends of the pole cores 10 to generate cooling air when rotated.

The field coil 11 is electrically connected to a pair of slip rings 17, which is carried by the shaft 9, through lead wires 11a and 11b and is supplied with the field current from a battery (not shown) through a pair of brushes 18 sliding on the slip rings 17. When the field current is supplied to the field coil 11, all the claw poles 10b of one of the pole cores 10A are magnetized to S-pole and all the claw poles 10b of the other pole core 10B are magnetized to N-pole.

The brush unit is composed of the brushes 18, springs 19 biasing the brushes 18 against the outer periphery of the slip rings 17, a brush holder 20 holding the brushes 18 and the spring 19 therein and a slip ring cover 21 covering the circumference of the slip ring 17.

The stator is composed of a stator core 22 press-fitted into the inner periphery of the front frame 2 and an armature winding disposed in the stator core 22.

Figure 5:
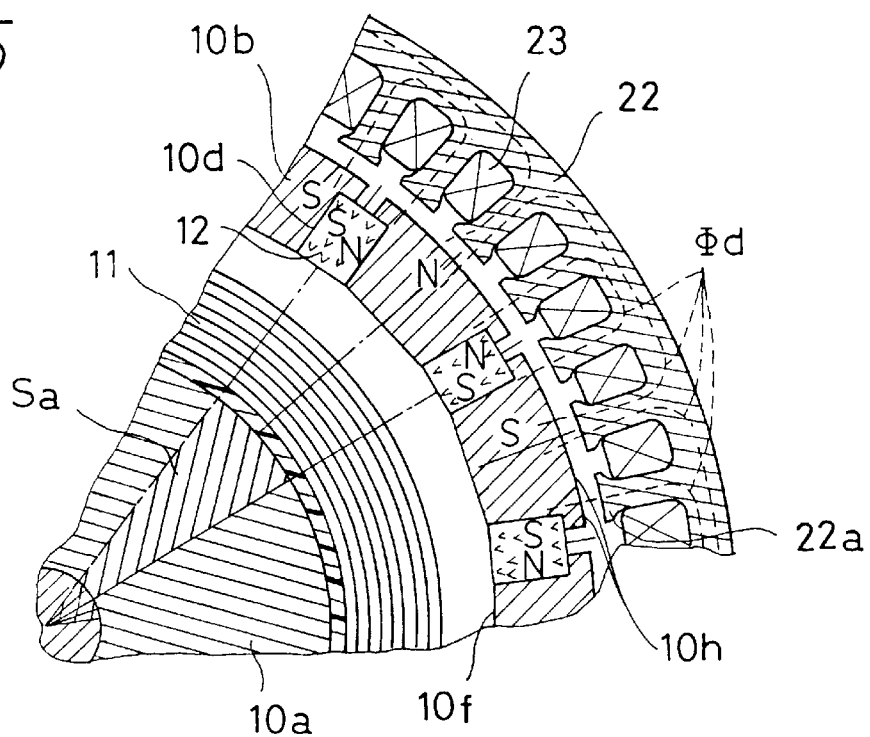
FIG. 5 is a cross-sectional view illustrating a magnetic path of a boss portion per pole.

The stator core 22 is composed of annular laminated-steel-plates having numbers of teeth 22a as shown in FIGS. 5 and 6 formed on the inner periphery thereof to face the outer peripheries of the claw poles 10b.

The stator winding 23 has Y-connected or Δ-connected three-separate-coils disposed in slots between the teeth 22a of the stator core 22 as shown in FIGS. 5 and 6 and generates AC voltage when rotor rotates.

The permanent magnets 12 are sintered ferrite magnets and are disposed between opposite side-surfaces 10d of the adjacent claw poles 10b in the rotating direction by a bond or the like. They are magnetized to have the same pole as the facing side-surface of the claw poles as shown in FIGS. 5 and 6.

Figure 2:
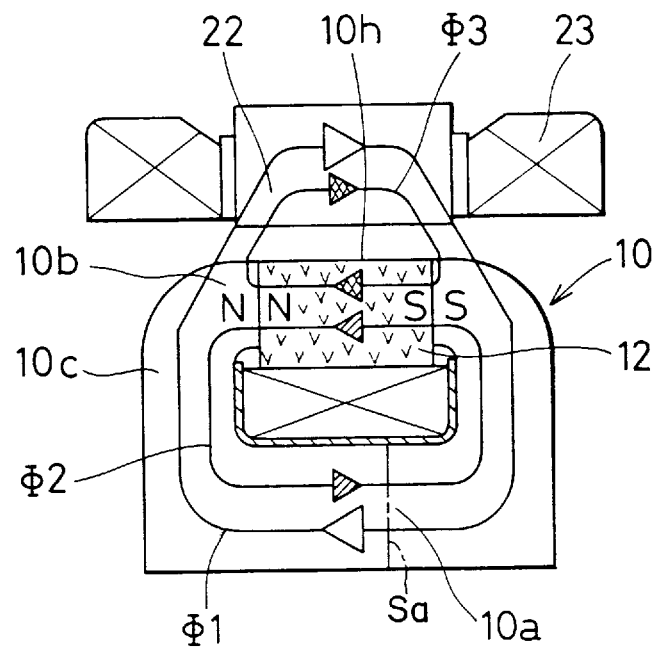
FIG. 2 is a schematic diagram showing magnetic flux generated by a field coil and magnetic flux generated by a permanent magnet.
Figure 3:
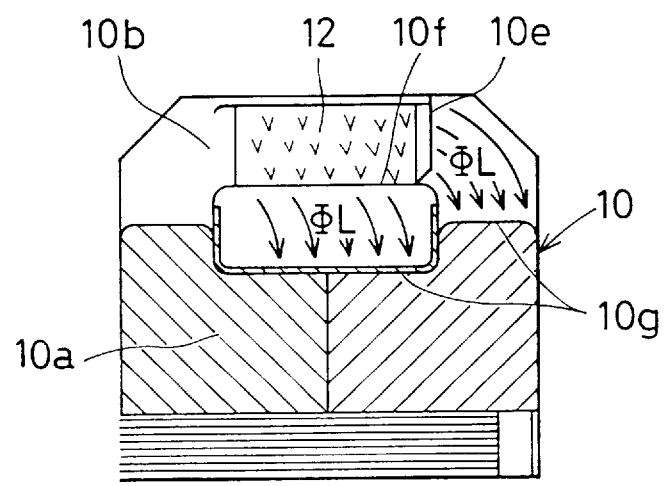
FIG. 3 is a schematic cross-sectional view illustrating a rotor with leakage magnetic flux.

As shown in FIG. 2, because the main magnetic flux Φ1 is generated at the boss portion 10a by the field coil 11 in a direction opposite to the magnetic flux Φ2 generated by the permanent magnet 12, the magnetic flux Φa (that is, Φ1–Φ2) passing through the boss portion 10a becomes smaller than the main flux Φ1. Thus, the cross-sectional area Sa of the magnetic-path per pole of the boss portion 10a can be made smaller than the cross-sectional area of the same magnetic path without permanent magnets. In the meantime, the number of magnetic poles corresponds to the number of claw poles 10b in this embodiment. That is, if the Lundell-type cores 10 have six claw poles, the number of poles is "6".

On the other hand, an effective magnetic flux Φd reaches the teeth 22a of the stator core 22 from the peripheral surface 10h of the claw poles 10b. The magnetic flux, before reaching the teeth, is reduced from the main magnetic flux Φ1 by the leakage flux ΦL (leakage magnetic flux between the edge portion 10e as well as the inner periphery 10f of the claw poles 10b and the outer periphery of the boss portion 10a) and increased by the magnetic flux Φ3 of the permanent magnet 12. Thus, an amount of the magnetic flux passing the peripheral surfaces 10h of the claw poles 10b or the effective magnetic flux Φd is larger than the amount without the permanent magnets 12. Therefore, the peripheral surface area Sd of the claw poles 10b facing the teeth 22a is designed to be wider than the peripheral surface area without the permanent magnets 12.

A ratio between the cross-sectional area Sa of the magnetic path of the boss portion 10a per pole and the peripheral surface area Sd of the portions of one of the claw poles 10b facing are directly opposite the teeth 22a when the center of each magnet 12 is midway between two successive teeth 22a is described next with reference to FIGS. 4, 5 and 6.

Figure 4:
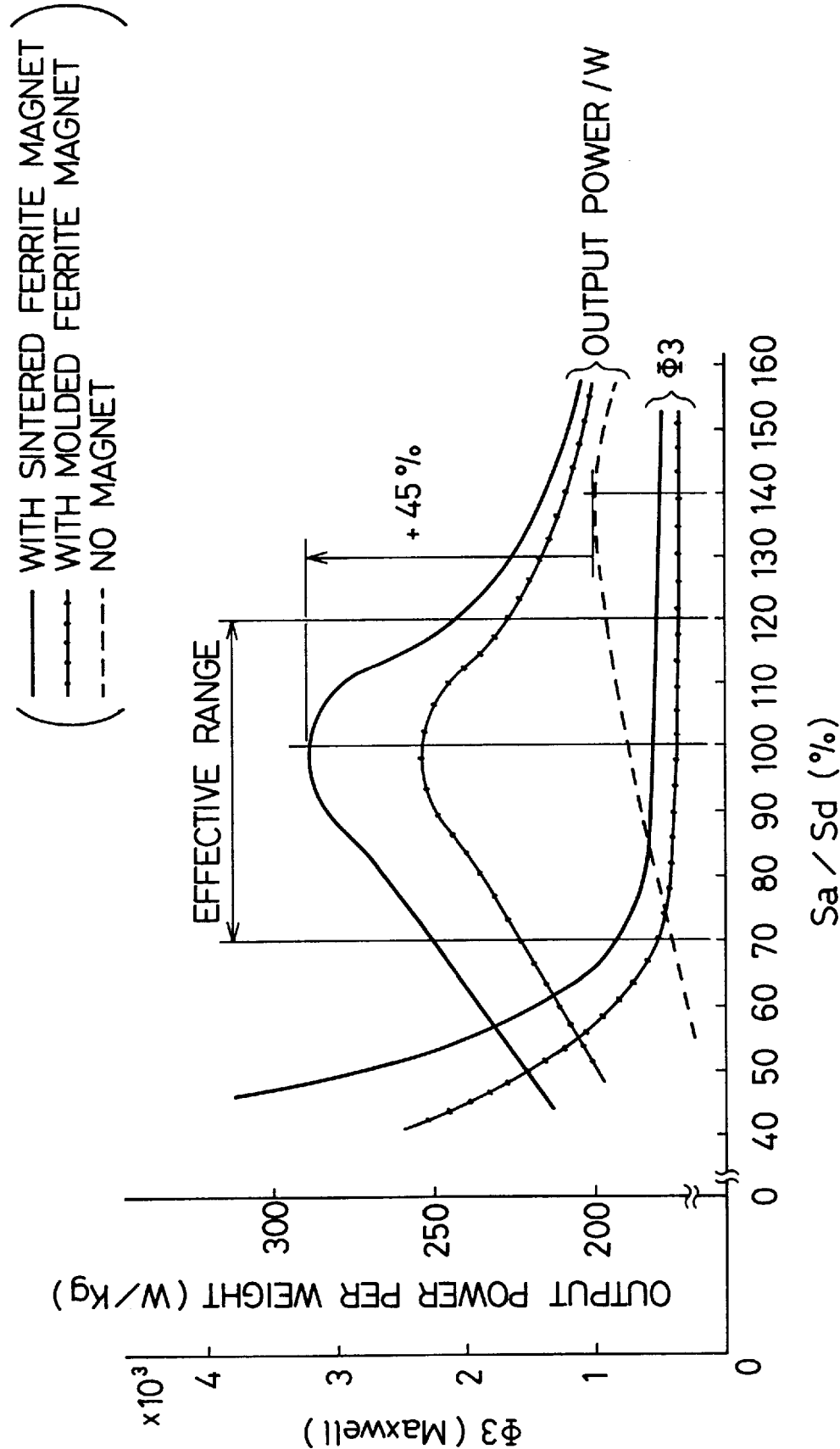
FIG. 4 is a graph showing relationship between output power of the rotor per pole as well as effective magnetic flux reaching the stator when no field current is supplied and ratio between the cross-sectional area of the magnetic path and peripheral surface of the claw poles.

The graph shown in FIG. 4 is obtained by using two kinds of permanent magnets and a pole core which have the following characteristics.

material of the permanent magnet:
(1) sintered ferrite magnet of Br:440 mT, $H_{CB}$:259 kA/m and $BH_{MAX}$:36.7kT/m$^3$
(2) molded ferrite magnet of Br:140 mT, $H_{CB}$:100 kA/m and $BH_{MAX}$:3.6 kT/m$^3$ size of the permanent magnet:
7.7 mm in width (disposed between the claw poles), 16 mm in length and 10 mm in depth number of poles: 12 material of the pole core:
cold forged steel of $B_{50}$:1.68 T, Hc:200 kA/m outer diameter of the pole core:90 mm axial length of the pole core:40 mm As the cross-sectional area Sa of the magnetic flux of the boss portion 10a becomes smaller relative to the peripheral surface area Sd, the output power per weight of the rotor increases steeply if the sectional ratio (Sa / Sd) is not higher than 120%. The critical sectional ratio of 120% is the same either with the sintered ferrite magnets or with the molded ferrite magnets. The embodiment with the sintered ferrite magnets provides a maximum output power when the sectional ratio is 100%, which is 45% greater than the output power of a generator having a conventional rotor which has no permanent magnet.

On the other hand, it is necessary to prevent an excessive voltage caused by the magnetic flux Φ3 of the permanent magnets 12 when no field current is supplied because such excessive voltage is detrimental to the battery. For this purpose, the magnetic saturation degree of the boss portion 10a is designed to be smaller than the magnetic saturation degree of the peripheral surface area Sd of the claw poles 10b. In order to decrease the magnetic flux Φ3, the ratio of the cross-sectional area Sa of the magnetic path to the cross-sectional area Sd of the claw poles 10b, that is, (Sa / Sd) should be no less than 70%. Because the embodiment has 100%-ratio of the cross-sectional areas, such excessive voltage is not generated.

Therefore, the output power of the rotor per weight increases and excessive voltage with no-field-current is prevented.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An AC generator for a vehicle having a combined structure of a field coil and a permanent magnet, said AC generator comprising:

a stator having a stator core with a plurality of teeth formed on a inner periphery thereof and a stator winding disposed between said teeth; and a rotor rotatably disposed inside said stator, in said rotor having a rotor shaft, a magnetic boss portion on which said field coil is wound, said magnetic boss portion being carried by said rotor shaft and being bounded radially by said rotor shaft and said field coil, a plurality of claw poles extending from opposite sides of said boss portion to face said teeth to provide a magnetic field, and a permanent magnet disposed between said claw poles; wherein said boss portion has a cross-sectional area Sa per pole perpendicular to the magnetic path of magnetic flux generate by said field coil and said permanent magnet, each of said claw poles has a peripheral surface, said peripheral surface having portions which are directly opposite said teeth when each said permanent magnet is centered midway between two successive teeth, and the portions having a total area Sd, and a ratio Sa/Sd is between 70% and 120%.

2. An AC generator as claimed in claim 1, wherein said ratio is approximately 100%.

3. An AC generator as claimed in claim 1, wherein said permanent magnet comprises a sintered ferrite magnet.

4. An AC generator as claimed in claim 1, wherein said permanent magnet comprises a molded ferrite magnet.

5. An AC generator as claimed in any one of claims 1, wherein each of said claw poles of said pole core comprises an approximately a trapezoidal peripheral surface facing said teeth.

6. An AC generator as claimed in claim 1, wherein said permanent magnet is disposed radially spaced apart from said field coil.

7. An AC generator as claimed in claim 1, wherein said rotor further has a pair of disc portions at opposite sides of said boss portion between said boss portion and said claw poles, and said field coil is in close contact with said opposite disk portions.

* * * * *